United States Patent [19]

Kia

[11] Patent Number: 4,798,763
[45] Date of Patent: Jan. 17, 1989

[54] METHOD OF MOLDING A LAMINATED FOAMABLE SHEET

[75] Inventor: Hamid G. Kia, Utica, Mich.

[73] Assignee: General Motors Corporation, Detroit, Mich.

[21] Appl. No.: 884,785

[22] Filed: Jul. 11, 1986

[51] Int. Cl.⁴ .................... B29C 39/10; B29C 67.22; C08J 9/08
[52] U.S. Cl. .................... 428/285; 264/45.3; 264/54; 264/257; 264/DIG. 5; 428/317.5; 428/317.9
[58] Field of Search ............ 264/45.8, 45.3, 257, 264/54, DIG. 5; 428/285, 317.5, 317.9

[56] References Cited

U.S. PATENT DOCUMENTS

| | | | |
|---|---|---|---|
| 3,025,202 | 3/1962 | Morgan et al. | 264/45.3 |
| 3,483,069 | 12/1969 | Cairns et al. | 264/45.3 X |
| 3,617,594 | 11/1971 | Willy | 264/45.3 |
| 3,627,603 | 12/1971 | Greig | 264/45.3 X |
| 3,860,371 | 1/1975 | Willy | 264/45.3 X |
| 3,867,494 | 2/1975 | Rood et al. | 264/45.3 |
| 4,028,158 | 6/1977 | Hipchen et al. | 264/45.3 X |
| 4,372,900 | 2/1983 | Doerfling | 264/45.3 |
| 4,386,983 | 6/1983 | Hipchen et al. | 264/45.3 X |
| 4,675,231 | 6/1987 | Kia | 428/285 |

FOREIGN PATENT DOCUMENTS

| | | | |
|---|---|---|---|
| 1808349 | 5/1970 | Fed. Rep. of Germany | 264/45.3 |
| 1451534 | 9/1966 | France | 264/45.3 |

OTHER PUBLICATIONS

Becker, Walter E., Edt., *Reaction Injection Molding,* New York, Van Nostrand Reinhold, ©1979, pp. 17-33.

Primary Examiner—Philip Anderson
Attorney, Agent, or Firm—Randy W. Tung

[57] ABSTRACT

A method of molding and forming a laminated foamable sheet which contains a solid catalyst that is activated at the molding temperature of the laminate. A laminated foamable sheet is first provided by saturating a glass fiber mat with a urethane foam composition containing a solid catalyst of stearate salt and then sandwich it between two layers of cover sheet. The solid catalyst contained in the urethane composition cannot be activated until it is heated to the molding temperature of the laminated sheet. The laminated foamable sheet is then positioned into a mold having two heated platens and a cavity defined therein with the mold temperature set at a temperature of at least that of the melting point of the solid catalyst contained in the urethane composition. The solid catalyst in the composition melts and causes the urethane precursors to start the foaming reaction such that the laminate expands and fills the cavity of the mold. After a sufficient length of time during which the foamed sheet is cured under heat and pressure, a completed part in the shape of the cavity is removed from the mold.

3 Claims, 1 Drawing Sheet

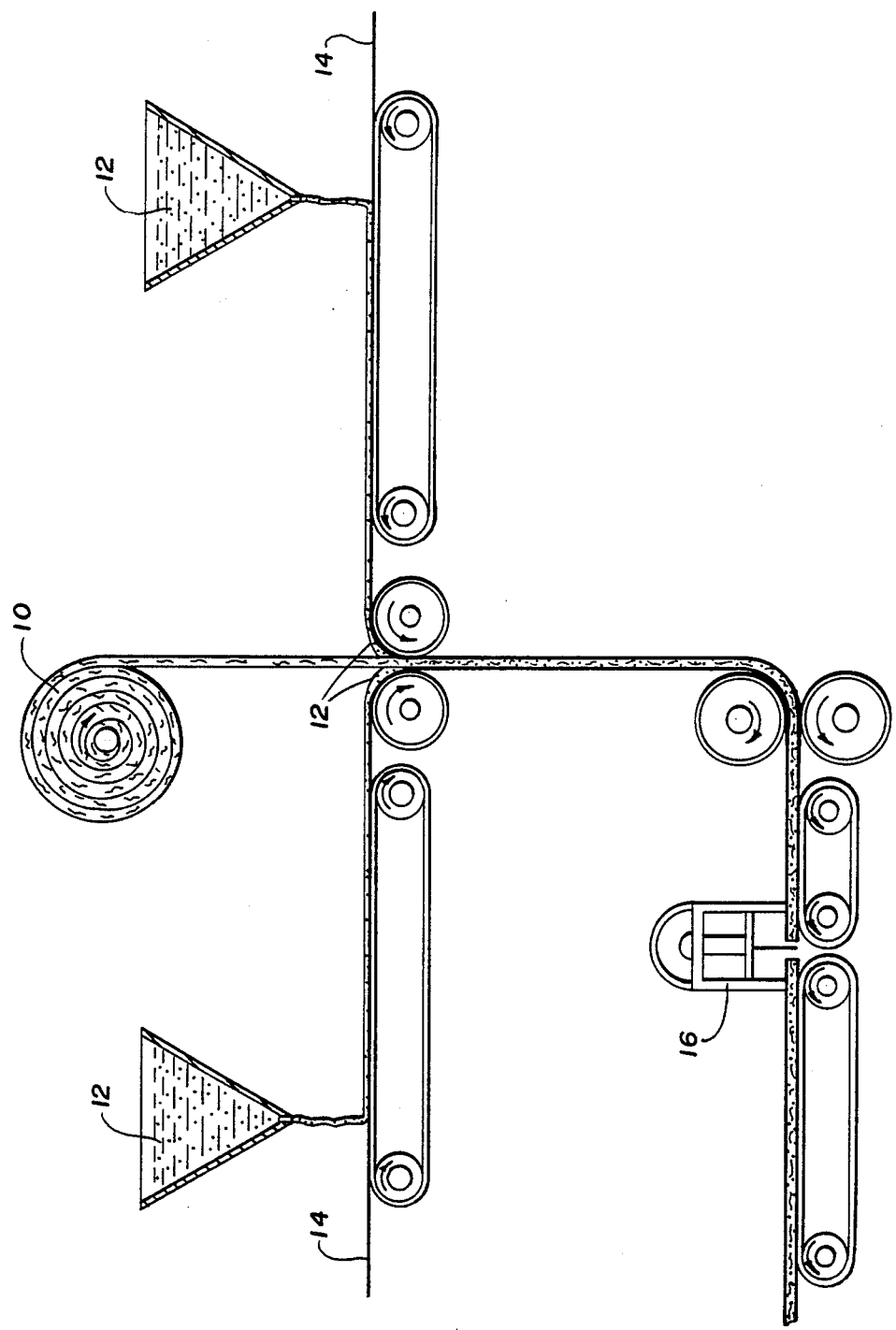

METHOD OF MOLDING A LAMINATED FOAMABLE SHEET

FIELD OF THE INVENTION

The present invention generally relates to a method of molding a laminated foamable sheet and, more particularly, is concerned with a method of molding a laminated foamable sheet which contains a solid catalyst that is activated at the molding temperature.

BACKGROUND OF THE INVENTION

Glass fiber reinforced lightweight plastic panels have found many applications in the automotive industry in recent years. These include the use of either short glass fibers or long strands of glass fibers. In the application of short glass fibers, both milled and chopped glass fibers are used for the reinforcement of thermoplastics or thermosets. On the other hand, long glass fiber strands are frequentl used in the form of glass fiber mats. These mats can be used as reinforcement in a plastic part by either injection molding a thermoplastic material or a RIM (reaction injection molding) type thermoset material into it.

Glass fiber mat reinforced plastic panels potentially can be used in either interior applications or exterior applications on an automobile. For instance, they can be used as load floors or seat backs in interior applications or body panels in exterior applications. The rigidity and strength of a glass fiber mat reinforced plastic panel are superior when compared to their steel counterparts. However, one drawback of this type of reinforced panels is that even though lighter than steel, their weight is still substantial because of the density of the thermoplastic or thermoset material used. This high density becomes more of a problem in some applications where both high strength and lightweight qualities are desired. For instance, in the application of an automobile headliner or interior door trim panels, a candidate material must have both the rigidity and the lightweight properties.

Many interior trim panels used in an automobile require shaping in a forming process. An ideal candidate for such applications should also be easily shapable or formable.

It is therefore an object of the present invention to provide a method of molding a laminated foamable sheet which can be used to shape glass fiber mat reinforced low density foam panels.

It is another object of the present invention to provide a method of molding a laminated foamable sheet so that lightweight automotive trim panels may be manufactured.

It is yet another object of the present invention to provide a method of molding a laminated foamable sheet such that a laminated foamable sheet expands in a heated mold to assume the shape of a cavity.

SUMMARY OF THE INVENTION

In accordance with two preferred embodiments of the present invention, a method of molding a laminated foamable sheet may be practiced by the following operative steps. First, a laminated foamable sheet is provided. The preparation of such a moldable, foamable reinforced plastic laminate is described in my U.S. Pat. No. 4,675,231, issued June 23, 1987 and assigned to the current assignee General Motors Corporation. One critical requirement of this laminated foamable sheet is that the sheet must contain a solid catalyst which cannot be activated until the catalyst is heated to the molding temperature of the laminated sheet.

The laminated foamable sheet is then positioned into a mold having two heated platens and a cavity defined by the interior surface of the platens. The temperature of the mold platen is at least that of the melting temperature of the solid catalyst contained in the urethane foam composition. The laminated sheet is compressed under low pressure in the mold for a short period of time. The solid catalyst in the composition melts and causes the urethane precursors to start foaming reaction such that the laminate expands and fills the cavity of the mold. After a predetermined length of time during which the foamed sheet is cured under heat and pressure, a foam sheet in the shape of a panel is removed from the mold and a finished product is obtained.

BRIEF DESCRIPTION OF THE DRAWING

FIG. 1 is a schematic representation of an apparatus suitable for practicing the laminate making process of the present invention.

DETAILED DESCRIPTION OF THE INVENTION

A method of molding a glass fiber mat reinforced lightweight panel used in applications such as door trim panels, interior linings, and headliners in an automobile is described herein. The material used in my lightweight panel is a polyurethane foam reinforced with continuous glass fibers in the form of glass fiber mats.

I have demonstrated the molding of a soft polyurethane panel with 50% hard segment in the application of an automobile headliner. This is shown in example 1. I have also demonstrated the use of a polyurethane resin containing 75% hard segment in the molding of automobile interior door panels. This is shown in example 2. It should be noted that the stiffness of the product can be easily changed to meet various product requirements by adjusting the hard segment content of the polyurethane resin.

For reinforcement, a continuous glass fiber mat supplied by the Owens Corning Fiberglass Co. (OCF-8610) was chosen. I have discovered that this type of glass fiber mat provides better moldability and more even foaming. These processing advantages stem from the fact that the fiber strands are not heavily sized to each other and as a result they can be stretched and formed to various geometries without tear. I have also discovered that the glass fiber content used is an important factor to consider. This is because the fibers provide stiffness and integrity and yet if used in excess they interfere with the foaming process and increase the density of the molded part. In the present invention, I have determined that 25% by weight glass fiber is an optimum glass content for providing sufficient rigidity while allowing for even foaming of the polyurethane resin.

For the molding process, a technique has been provided such that it may be completely automated. As shown in FIG. 1, a roll of glass fiber mat 10 is first wetted with polyurethane resin 12, wrapped between 520 layers of paper 14, and then cut by cutter 16 to a desirable size such that they are ready to be molded at a later time. The shelf life of these laminated foamable sheets is an important consideration in the practice of the present invention. I have found that by suitably selecting the type of catalysts and chain extenders, the shelf life of a foamable laminate prepared by my technique can be extended to as long as several weeks.

The barrier sheets used in the present invention are inexpensive papers that can be molded along with the mat and the resin. Barrier sheets of other materials may also be suitably used. My foamable laminate may be easily handled and cut to any size desired for storage. Because of the nature of glass fiber mat used, 100% mold coverage should be used for the size of a charge.

A two component polyurethane composition was used in my invention containing three major ingredients; polyol, an isocyanate, and a chain extender. To prevent the occurrence of fast foaming reaction at room temperature, a solid catalyst in the form of powder is used. This catalyst is zinc stearate which has a solid-to-liquid melting point of 250° F. I believe that any other catalyst that is a solid at room temperature and has a melting point higher than room temperature may work equally well. The chemicals used in the present invention and their commercial sources are identified as follows. Isonate 181 which is a diphenylmethane diisocyanate having an equivalent weight of 183.3 was supplied by the Dow Chemical Co. Niax 1134 which is a primary polyether triol having an equivalent weight of 1516.2 was supplied by the Union Carbide Corp. Pluracol PEP 550 which is a secondary polyether tetrol having an equivalent weight of 137.5 was supplied by the BASF Wyandotte Co. Glass Fiber M-8610 which is a continuous glass fiber mat having a 1 oz/ft$^2$ density composed of 1 inch long chopped glass rovings was supplied by the Owens Corning Fiberglass Corp. The barrier sheets used in the present invention is a common wrapping paper having 4 gm/ft$^2$ density.

EXAMPLE 1

Sample Headliner of Soft Polyurethane

The formulation I used for a soft polyurethane sample headliner is shown in table 1.

TABLE 1

| Formulation for Soft Polyurethane | |
|---|---|
| Component | Weight grams |
| Polyol (Niax 1134) | 50.0 |
| Isocyanate (Upjohn, Isonate 181) | 47.0 |
| Ethylene glycol (grade AR) | 6.0 |
| Zinc Stearate | 1.0 |
| Water | 1.0 |

Ethylene glycol is used as a chain extender while water is used as the foaming agent.

Two 12×12" paper sheets are placed on a bench, a thin layer of soft polyurethane resin composition is spread over the paper sheets at a coverage of approximately 20 gms/ft$^2$. A glass fiber mat is cut to 12" by 12" dimension and placed between the two paper sheets such that the resin coated side is on the inside of the laminate. A roller is then used to compact the laminated sheet to allow complete wetting of the fibers.

After a laminated sheet is prepared, it is transferred to a heated mold mounted in a low tonage press for forming and foaming. The foaming reaction takes place as the resin cures in the mold. The mold temperature I used is 260° F. and the cycle time is approximately 1 minute. A mold pressure of approximately one ton per each square footage area is used. This translates to a molding pressure of approximately 14 psi.

After 1 minute, a molded part is removed which has assumed the shape of the mold cavity. One of the unique features of my invention is that the foaming process only takes place in the molding cycle. The foaming pressure forces the laminated sheet to assume the shape of the mold cavity. As a consequence, no post-molding shaping or forming is necessary. The laminated sheet is approximately 2 mm thick prior to molding and expands to 12 mm thick (the cavity size) after molding.

Another unique feature of my invention is that the chemistry of the resin is such that it allows for a delayed molding operation. This is due to the fact that the solid catalyst of zinc stearate used melts at 250° F. and therefore the foaming reaction is very slow until that temperature is reached. I have discovered that my soft polyurethane composition has a shelf life of approximately two hours during which a panel may be molded. A sample headliner thus obtained has a density of 75 gms/ft$^2$ and a thickness of 12 mm.

In an alternate process, a piece of decorative cloth is placed on one side of the sandwiched structure in the laminating process. The laminate is then molded by the same method. A headliner having a decorative cloth bonded on one side is produced. The sample headliner weighs 90 gms/ft$^2$ and is 15 mm thick.

EXAMPLE 2

Sample door panel of rigid polyurethane

To make a substrate for an automotive interior door panel, a rigid polyurethane resin formulation as that shown in Table 2 is used.

TABLE 2

| Formulation for Rigid Polyurethane | |
|---|---|
| Component | Weight grams |
| Polyol (BASF, Pluracol PEP 550) | 24.0 |
| Isocyanate (Upjohn, Isonate 181) | 76.0 |
| Ethylene glycol (grade AR) | 6.0 |
| Zinc Stearate | 1.0 |
| water | 1.0 |

Two 30" by 40" plastic sheets of Mylar of 0.005 inch thick were placed on a bench, a thin layer of rigid polyurethane composition is applied on the sheets at a coverage of 20 gms/ft$^2$. Chopped glass fiber roving of 1 in. length is then sprinkled on the sheets at a coverage of 14 gms/ft$^2$. Next, a 30" by 40" glass fiber mat is placed on one of the plastic sheets and the other sheet is then placed on top of the glass mat such that the resin coated sides are on the inner side. A roller is used to compact the laminated sheet to a thickness of approximately 2.5 mm thick.

For the molding operation, the mylar sheets were removed to avoid the formation of wrinkles. The charge was placed in a door panel mold and molded at 260° F. for 1 minute. A sample interior door panel substrate is obtained which weighs 96 gms/ft$^2$ and is approximately 3 mm thick. The physical strength of this interior door panel substrate formed of rigid polyurethane was tested. The flexural strength was found to be 40 MPa and the flexural modulus was found to be 2,000 MPa.

In an alternate process, a piece of decorative cloth is first placed on the laminate during the laminating process and the laminate is then molded as previously. The product is a sample door panel with a decorative cloth on one side. The product weighs 116 gms/ft$^2$ and is approximately 6 mm thick.

To further improve the rigidity of the part molded, I have discovered that two approaches may be used. First, the amount of the urethane resin may be increased. This leads to a part with a heavier density and thus a part with a more rigid structure. Another approach is to mold the part in a cavity with build-in ribs. A ribbing structure added on the back of a door panel part greatly improves its rigidity.

While my invention has been described in terms of two preferred embodiments thereof, it is to be appreciated that those skilled in the art will readily apply these teachings to other possible variations of the invention.

The embodiments of the invention in which an exclusive property or privilege is claimed are defined as follows:

1. The method of molding a glass fiber reinforced polyurethane foamed article by first laminating a glass fiber mat wetted with a composition of urethane foam precursors containing a solid catalyst between two barrier sheets and then placing the laminate in a heated mold having two platens defining a cavity therein wherein heat activates said catalyst to start a rapid foaming reaction such that the laminate expands to fill the cavity, said method comprising the steps of:
   (1) wetting a glass fiber mat with a composition of urethane foam precursors containing a solid catalyst of stearate salt inactive at temperatures below its melting temperature,
   (2) placing said wetted glass fibers between two barrier sheets,
   (3) compressing under suitable pressure said wetted glass fibers between said barrier sheets into a laminate,
   (4) storing said laminate for a predetermined length of time not longer than 1 month,
   (5) positioning said laminate into said heated mold, the temperature of said mold being at least that of the melting temperature of said solid catalyst,
   (6) compressing said laminate in said heated mold under sufficient pressure and for a sufficient length of time, whereby said solid catalyst melts and causing said urethane precursors to foam in such a way that said laminate expands to fill the cavity of said mold,
   (7) curing said foamed article in said mold under heat and pressure,
   (8) removing said foamed article from said mold.

2. The method of molding a glass fiber reinforced polyurethane foamed article by first laminating a glass fiber mat wetted with a composition of urethane foam precursors containing a solid catalyst between two barrier sheets and then placing the laminate in a heated mold having two platens defining a cavity therein wherein heat activates said catalyst to start a rapid foaming reaction such that the laminate expands to fill the cavity, said method comprising the steps of:
   (1) wetting a glass fiber mat with a composition of urethane foam precursors containing a solid catalyst of stearate salt having a melting temperature of at least 100° F., said solid catalyst being inactive at temperatures below its melting temperature,
   (2) placing said wetted glass fibers between two barrier sheets,
   (3) compressing under suitable pressure said wetted glass fibers between said barrier sheets into a laminate,
   (4) storing said laminate for a predetermined length of time not longer than 1 month,
   (5) positioning said laminate into said heated mold, the temperature of said mold being at least 10° higher than the melting temperature of said solid catalyst,
   (6) compressing said laminate in said heated mold under a pressure of at least 5 psi and for a length of time of at least 30 seconds, whereby said solid catalyst melts and causing said urethane precursors to foam in such a way that said laminate expands to fill the cavity of said mold,
   (7) curing said foamed article in said mold under heat and pressure,
   (8) removing said foamed article from said mold.

3. A glass fiber reinforced polyurethane foamed article molded by the process of claim 1.

* * * * *